Figures 1, 2:
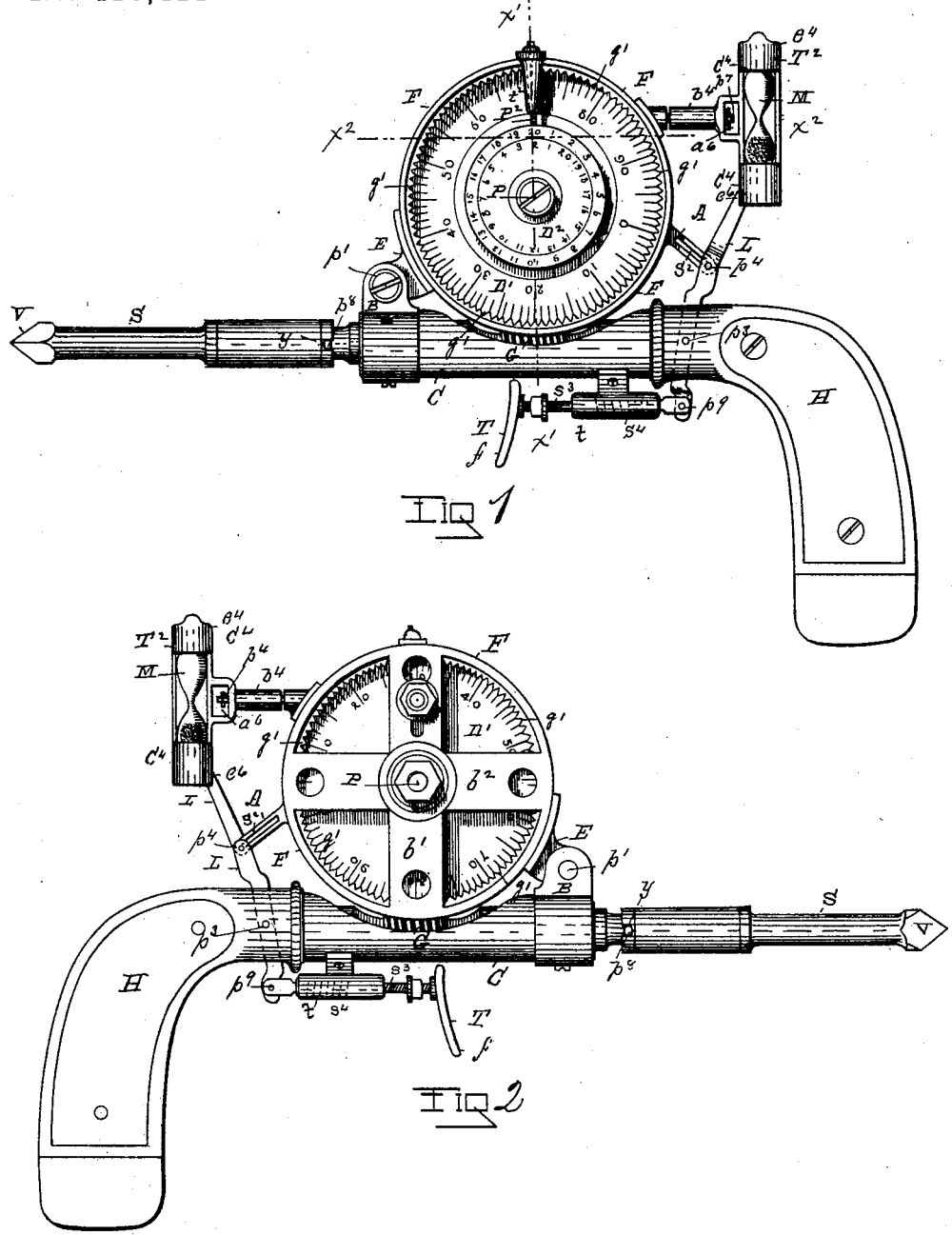

(No Model.) 2 Sheets—Sheet 1.

L. B. HOLMES.
SPEED INDICATOR.

No. 418,411. Patented Dec. 31, 1889.

WITNESSES
William A. Swett
Charles S. Brintnall

INVENTOR
Louis B. Holmes
by W. E. Hagan atty

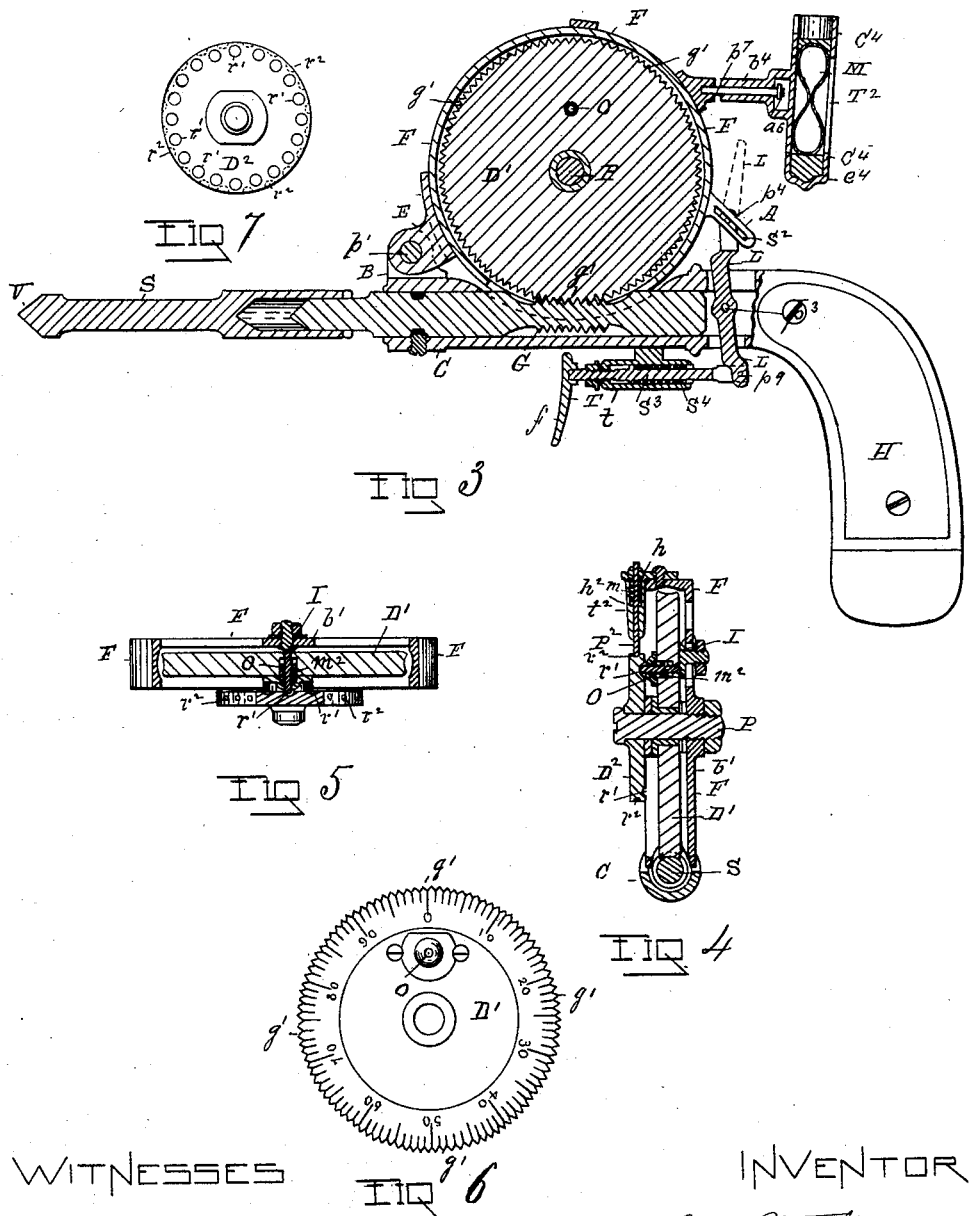

UNITED STATES PATENT OFFICE.

LOUIS B. HOLMES, OF COHOES, ASSIGNOR OF ONE-HALF TO WILLIAM T. LINTNER, OF TROY, NEW YORK.

SPEED-INDICATOR.

SPECIFICATION forming part of Letters Patent No. 418,411, dated December 31, 1889.

Application filed April 29, 1889. Serial No. 308,995. (No model.)

*To all whom it may concern:*

Be it known that I, LOUIS B. HOLMES, of the city of Cohoes, county of Albany, State of New York, have invented new and useful Improvements in Speed-Indicators, of which the following is a specification.

My invention relates to improvements upon that class of devices that are employed to determine the speed of revolving shafts; and my invention has for its object to render these devices accurate in their speed-indication and convenient for use.

My invention consists (as will be more fully detailed hereinafter in connection with its illustration) in the combination, with a spindle which is adapted at one of its ends to engage with the end center of a shaft or wheel, so as to turn synchronously with the latter, and at its other end having a worm-gear and provided with a cylindrical-tube-form bearing or stock in which to turn, said tube-form bearing being constructed with a pistol-form handle at its grasping end; a dial-plate turning on a pin arranged in a pivoted frame and having gears upon its rim that will mesh into said worm-gear, said dial-plate indicating in units and tens the number of revolutions as made by the spindle and shaft; a dial-plate turning on the same center pin as the units and tens dial, but having graduated thereon a scale indicating hundreds of revolutions as made by the shaft and spindle, and actuated by the units and tens dial to register one hundred at each revolution of the latter, and a trigger operated to connect the worm-gear on the spindle with the gears on the rim of the units and tens dial plate, and also to put in operation a timing mechanism.

Accompanying this specification, to form a part of it, there are two plates of drawings containing seven figures, illustrating my invention, with the same designation of parts by letter reference used in all of them.

Of the illustrations, Figure 1 is a side elevation of the mechanism with the graduated faces of the dial-plate turned toward the sight, and with the dial mechanism not operated to connect with the operating-spindle. Fig. 2 shows a view of the mechanism, taken on the side which is opposite to that illustrated at Fig. 1, with the parts in the same position relatively to the operating-spindle, as shown therein. Fig. 3 is a section taken centrally and longitudinally through the apparatus, with the gears on the units and tens dial plate engaging with the worm-gear on the spindle. Fig. 4 is a cross vertical section taken on the line $x'\ x'$ of Fig. 1. Fig. 5 is a segmental section taken on the line $x^2\ x^2$ of Fig. 1. Fig. 6 is a side elevation of the front of the units and tens dial, shown as detached; and Fig. 7 is a side view of the hundreds-dial with what is its rear face when in position turned toward the sight.

The several parts of the mechanism thus illustrated are designated by letter reference, and the function of the parts is described as follows:

The letter S designates the spindle, which at its outer end is made with the sharp and angularly-pointed termination V, and by which it is adapted to engage with and be operated by the end center of a shaft or wheel, so as to turn synchronously therewith. This spindle is preferably made with a detachable end that is arranged to be sleeved on to the spindle proper, the sleeved part beng made with oppositely-formed end slots $y$ and a pin $p^8$ on the spindle proper, as shown at Figs. 1 and 2.

The letter G designates a worm-gear formed on the inner end of the spindle, the latter being arranged to turn freely in the stock C.

The letter F designates a hoop-form frame, which is pivoted at $p'$ by means of an ear E on the said frame to a bracket B on the stock, so that it may be operated to swing up and down thereon.

The letter A designates an arm attached to the edge of the hoop-form frame upon its side edge that is opposite to that on which the ear E is placed. This arm A is made with a slot $S^2$.

The letter T designates a trigger having the finger-piece $f$, the stem $s^3$ with the latter adapted to be moved backwardly toward the handle H against the force of the spiral spring $s^4$, encircling said stem within the tube $t$.

The letter L designates a lever that is pivoted to the stock C at $p^3$. This lever L beyond its pivot has a pin $p^4$, that passes through the slot $S^2$ of the arm A, with a securing-head on it where extended through said slot, with the lower end of said lever pivoted to the trigger-stem at $p^9$, so as that when the trigger is pulled backwardly toward the handle the lever L, connected with the trigger-stem by means of its pin and slotted connection with the arm A, moves the hoop-form frame F downwardly on its pivotal connection at $p'$, so that the gears on the rim of the units and tens dial will mesh into the worm-gear on the spindle. This hoop-form frame F is cut away on its lower side, as indicated at Figs. 3 and 4.

The letters D' designate the units and tens dial, which is radially laid off on its dial-face to designate by its movement of one point in the graduation each revolution of the spindle and the shaft or wheel actuating the latter.

The letters $b'$ and $b^2$ designate cross-bars, which are diametrically arranged upon the back of the hoop-form frame F, and P a pintle-shaft arranged at the diametrical center of the said frame where the cross-bars $b'$ and $b^2$ thereof intersect each other at right angles, on which pintle the units and tens dial D' turns.

The letters $g'$ designate teeth made in the rim of said dial-plate $d'$, adapted to engage with the worm-gear G on the spindle when the trigger is operated to draw down the frame F and said dial-plate so that the teeth thereon will mesh into the worm-gear on the spindle.

The letter $P^2$ designates a pointer-pin which is downwardly projected from a frontwardly-extended overhang $h$, made on the top of the frame F. This pointer-pin is arranged within the vertically-placed tube $t^2$, having a shoulder $h^2$ made therein, between which latter and the cap of the said tube this pin is encircled by a spring $m$. This pin, besides answering as a pointer to the zero or starting point of the dial-plate D', performs another function, which will be described hereinafter.

The letter $D^2$ designates the hundreds-dial plate, which is made smaller than and is arranged in front of the units and tens dial plate D', and it is operated by the latter to move one notch or measure of its graduated scale at each complete revolution of the dial-plate D' by the following means.

The letters I designate, at Figs. 4 and 5, a projection having a rounded contour which is produced on the inner face of the cross-bar $b'$, so as to be vertically in line at its outwardly-rounded center with the pointer $P^2$ of the frame F; and the letter O designates a spring-pin arranged in the face of the dial-plate D' inside of its scale-indication, as shown at Fig. 6. At the rear side of the dial-plate D', in which this pin operates, it passes beyond the rear face of said dial-plate and it is housed in a tube-form passage within the latter, and is encircled by a spiral spring $m^2$, so that when moved frontwardly through said dial-wheel D' this pin is moved against the force of its encircling-spring. As thus placed and arranged, when the dial-plate D' is about completing one revolution to indicate one hundred revolutions of the shaft or wheel which operates the spindle, then the pin O on its rear end, where projecting beyond the face of the dial-wheel D', commences to engage with the projection I on the cross-bar $b'$, which engagement moves the pin O frontwardly against the force of the spring from out of the dial-face of said wheel, with its outer end entering one of the recesses $r'$, made in the back face of the dial-plate $D^2$, (indicated at Fig. 7,) to engage therewith and move said last-named dial-plate one point of its dial measurement, and when the other end of said pin O has passed over the projection I the pin is drawn back by its spring. While the pin O is thus moving the dial $D^2$, the zero-pin $P^2$ is raised from out of one of the recesses $r^2$ formed in its rim to descend into the succeeding recess when the engagement of the pin O and projection I has ceased, to hold the dial $D^2$ in place when not actuated by the pin O.

The letters $T^2$ designate the timing mechanism, which, as herein shown, consists of a sand-glass M, that is mounted in a cylinder $C^4$, having open sides, with that end $e^4$ (which is the lower end when in operation) leaded, so as to be heavier than the other end. This cylinder is provided with a side offset and cylindrical bearing $b^4$, that with the cylinder M turns freely on the pin $p^7$, having a head arranged thereon within the arbor $a^6$. The lower end of this cylinder $C^4$ is slotted to receive an outward extension $e^6$ of the lever L. When the apparatus is started, this timing-glass is in the position shown at Figs. 1 and 2. When the trigger is pulled to start the spindle, the lever L at the same instant releases the timing device so as to have the latter promptly invert to commence measuring the time, while the other mechanism is indicating the number of revolutions. This timing mechanism is preferably graduated to run a minute; but any other measure of time that is desirable may be used by so arranging the sand-glass or other equivalent mechanism.

As the result produced by the combined action of the trigger, the spindle, and dial-movement would be the same, whether the timing mechanism used was that which I have shown or some other known timing mechanism was employed that was started synchronously with the spindle and dial by means of the trigger; hence I do not limit my invention to the application of a timing mechanism, as shown, and, if desired, the spindle and connected dial-movement operated by a trigger which I illustrate may be used without a connectedly operating timing mechanism and a watch substitute therefor.

As thus made and arranged, an accurately-measuring indicator is produced that is very conveniently adapted to the use for which it is designed.

Having thus described my invention, what I claim, and desire to secure by Letters Patent, is—

1. In a speed-indicator, the combination, with a spindle arranged to turn in a stock and adapted to engage at one of its ends with the end center of a revolving shaft so as to be turned thereby, and at its other end constructed with a worm-gear, of a dial-plate having gears upon its perimeter and provided with a bearing upon which to turn in a frame that is pivoted to the spindle-stock, and a trigger and pivoted lever constructed to move said frame and dial-plate so as to cause the gears on the latter to mesh into said worm-gear on the spindle, substantially in the manner as and for the purposes set forth.

2. In a speed-indicator, the combination, with a spindle arranged to turn in a stock having a pistol-form handle and adapted at one of its ends to engage with the end center of a revolving shaft, so as to be turned thereby, and where within the stock constructed with a worm-gear, of a dial-plate having gear-teeth upon its perimeter, a graduated scale on its outer face indicating units and tens of revolutions and mounted to turn in a hoop-form frame that is pivoted to the stock, a trigger and pivoted lever operating to connect the said worm-gear with the dial-gear, and a dial-plate graduated to indicate hundreds of revolutions, said dial having less diameter than the units and tens dial and arranged in front of the latter to turn on the same shaft and operated to be moved one point by and at each revolution of the units and tens dial, substantially as shown and described.

3. In a speed-indicating mechanism, the combination, with the dial-plate D', constructed with the spring-pin O, and a perimetral gear for receiving motion and having a pintle-shaft P, of the frame F, made with the projection I, the stay or zero pin $P^2$, and the dial-plate $D^2$, arranged to turn on the pintle-shaft P outside of the dial-plate D', said dial-plate $D^2$ being constructed with the recesses $r'$ on its inner face and the recesses $r^2$ on its perimetral face, substantially in the manner as and for the purposes set forth.

4. In a speed-indicating mechanism, the combination, with the spindle S, constructed with the cylindrical form bearing or stock C, in which to turn, and having when within the said stock or cylinder the worm-gear G, of the frame F, pivoted to said stock and constructed with the pointer $P^2$, and having upon its inner face the projection I, the dial-plate D', having a perimetral gear, a spring-pin O, and made with a pintle-shaft on which to turn, the dial-plate $D^2$, arranged to turn on the same shaft as the dial-plate D' outside of the latter, and made with the perimetral recesses $r'$ and with the recesses $r^2$ on its inner face, the pivoted lever L, and the trigger T, constructed and arranged to operate substantially as shown and described.

5. In a speed-indicator, the combination, with a spindle arranged to turn in a stock and to engage at one of its ends with the end center of a revolving shaft and at its other end provided with a worm-gear, of a frame that is pivoted to the spindle-stock and having arranged thereon a timing mechanism, a dial-wheel arranged to turn in said frame and having gear-teeth upon its perimeter, and a trigger and lever arranged to cause said worm-gear to engage with said dial-wheel and at the same time put in operation the timing mechanism, substantially in the manner as and for the purposes set forth.

6. In a speed-indicator, the combination, with a spindle adapted to engage with a revolving shaft to receive power therefrom, of a worm-gear on said spindle, a pivoted frame having a timing mechanism thereon and having also a graduated dial provided with gears upon its rim constructed to turn in said frame, and a trigger constructed to put the timing mechanism in operation and at the same time cause the worm-gear on the spindle to engage with the dial-plate, substantially in the manner as and for the purposes set forth.

7. In a speed-indicator, the combination, with a spindle arranged to turn in a stock and adapted at one of its ends to engage with a revolving shaft and at the other end provided with a worm-gear, of a dial-plate provided with gears upon its rim and operated to engage and disengage with said worm-gear, and a time-indicating sand-glass constructed and connected to be put in operation simultaneously with the engagement of the worm-gear with the dial-plate, substantially in the manner as and for the purposes set forth.

8. The combination, with the stock or cylinder C, of the pistol-form handle H, turned down on an angle from said stock, the spindle S, having the worm-gear G and arranged to turn in the latter, the frame F, pivoted to said stock, the dial D', made with the perimetral gear $g'$ and arranged to turn in said frame, the pivoted lever L, making a pivotal engagement with said frame, and the trigger T, making a pivotal engagement with said lever, substantially as shown and described.

9. In a speed-indicator, the combination, with a pistol-form handle, of a cylindrical-form stock, a spindle having an angularly-pointed outer end and made with a worm-gear where within the stock, a frame pivoted to said stock, a dial-plate having gear-teeth upon its perimeter and adapted to turn in said frame, a lever making pivotal connection with said frame and said stock, and a trigger making a pivotal connection with said pivoted lever, constructed and arranged to operate substantially in the manner as and for the purposes set forth.

Signed at Troy, New York, this 22d day of April, 1889, and in the presence of the two witnesses whose names are hereto written.

LOUIS B. HOLMES.

Witnesses:
W. E. HAGAN,
CHARLES S. BRINTNALL.